(12) United States Patent
Kang

(10) Patent No.: US 12,509,082 B2
(45) Date of Patent: Dec. 30, 2025

(54) METHOD AND APPARATUS FOR ASSISTING VEHICLE STOPPING USING SVM

(71) Applicants: HYUNDAI MOTOR COMPANY, Seoul (KR); KIA CORPORATION, Seoul (KR)

(72) Inventor: Min Chul Kang, Uiwang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 77 days.

(21) Appl. No.: 18/428,567

(22) Filed: Jan. 31, 2024

(65) Prior Publication Data

US 2025/0136114 A1 May 1, 2025

(30) Foreign Application Priority Data

Oct. 25, 2023 (KR) ........................ 10-2023-0143823

(51) Int. Cl.
*B60W 30/18* (2012.01)
*B60W 30/16* (2020.01)
*G06V 10/25* (2022.01)
*G06V 10/44* (2022.01)
*G06V 10/60* (2022.01)
*G06V 20/56* (2022.01)
*G06V 20/58* (2022.01)

(52) U.S. Cl.
CPC .......... *B60W 30/181* (2013.01); *B60W 30/16* (2013.01); *B60W 30/18154* (2013.01); *G06V 10/25* (2022.01); *G06V 10/449* (2022.01); *G06V 10/60* (2022.01); *G06V 20/58* (2022.01); *G06V 20/588* (2022.01); *B60W 2420/403* (2013.01); *B60W 2552/53* (2020.02); *B60W 2554/40* (2020.02); *B60W 2554/802* (2020.02)

(58) Field of Classification Search
CPC ............... B60W 30/181; B60W 30/16; B60W 30/18154; B60W 2420/403; B60W 2552/53; B60W 2554/40; B60W 2554/802; G06V 10/25; G06V 10/449; G06V 10/60; G06V 20/58; G06V 20/588; G06V 20/586
USPC .......................................................... 701/70
See application file for complete search history.

(56) References Cited

U.S. PATENT DOCUMENTS

| 2020/0209864 | A1* | 7/2020 | Chen | G01C 21/3811 |
| 2024/0043006 | A1* | 2/2024 | Ko | B60W 30/18109 |
| 2024/0391462 | A1* | 11/2024 | Kim | B60W 30/18159 |
| 2025/0022365 | A1* | 1/2025 | Freienstein | G08G 1/166 |

* cited by examiner

*Primary Examiner* — Hai H Huynh
(74) *Attorney, Agent, or Firm* — Lempia Summerfield Katz LLC

(57) ABSTRACT

A method and apparatus for assisting a vehicle to stop at crosswalks and intersections by using a surround view monitor (SVM). In particular, the method includes: obtaining a front top-view image of the vehicle by using the SVM, performing a stop line detection in the front top-view image, and performing a crosswalk detection in the front top-view image in response to no detection of a stop line. The method further includes: generating a virtual stop line in response to a detection of a crosswalk, and controlling the vehicle to stop based on the detected stop line or the generated virtual stop line.

18 Claims, 6 Drawing Sheets

METHOD AND APPARATUS FOR ASSISTING VEHICLE STOPPING USING SVM

CROSS-REFERENCE TO RELATED APPLICATIONS

This application claims the benefit of and priority to Korean Patent Application Number 10-2023-0143823, filed Oct. 25, 2023, the disclosure of which is incorporated by reference herein in its entirety.

FIELD

The present disclosure relates to a method and an apparatus for assisting a vehicle to stop using a surround-view monitor (SVM). More specifically, the present disclosure relates to techniques for assisting a vehicle to stop in front of a crosswalk or intersection utilizing front top-view images of SVM.

BACKGROUND

The statements in this section merely provide background information related to the present disclosure and do not necessarily constitute prior art.

Surround-view monitor (SVM) improves safety and convenience of vehicle operation by providing the driver with a visualization of the surrounding environment while driving or parking. The SVM may operate in specific driving scenarios. For example, it automatically activates during reverse maneuvers to enhance safety, or while driving when the Parking/View button is turned on for convenience as the vehicle moves forward at a low speed.

The SVM retains the front or rear view it displays as long as the vehicle operates at low speeds (e.g., at or below 10 km/h), but the front or rear view is turned off when the vehicle exceeds 10 km/h. In particular, in order to see the SVM front top view while the vehicle stops again, there is a situation in which the SVM needs to be turned off and turned on again. This may be inconvenient for users who want to use the SVM front top view for compliance with stop-line regulations.

Laws and regulations are getting tougher on the obligation of vehicles to stop at crosswalks or intersections, such as the obligation to stop at unsignalized crosswalks, the obligation to stop at unsignalized crosswalks in school zones or child protection zones regardless of whether pedestrians are passing, the obligation to stop when turning right at an intersection, and the obligation of vehicles making a right turn to stop at the red light regardless of whether pedestrians are passing, even where a right turn signal is not installed.

SUMMARY

The present disclosure is directed to solving the aforementioned deficiencies and seeks to provide a method and apparatus utilizing SVM front top-view images for assisting in stopping a vehicle in front of a crosswalk or intersection.

The purposes of the present disclosure are not limited to those mentioned above, and other purposes not mentioned herein should be clearly understood by those having ordinary skill in the art from the following description.

According to at least one embodiment, the present disclosure provides a method of assisting a vehicle to stop at crosswalks and intersections by using a surround view monitor (SVM). The method includes: obtaining a front top-view image of the vehicle by using a surround-view monitor (SVM), and performing a stop line detection in the front top-view image. The method further includes: performing a crosswalk detection in the front top-view image in response to no detection of a stop line, and generating a virtual stop line in response to a detection of a crosswalk, and controlling the vehicle to stop based on the detected stop line or the generated virtual stop line.

According to another embodiment, the present disclosure provides a computing device including at least one processor and a memory operatively coupled to at least one processor. The memory stores instructions that cause at least one processor to perform operations in response to the execution of the instructions by the at least one processor. In particular, the operations includes: obtaining a front top-view image of the vehicle by using a surround-view monitor (SVM), performing a stop line detection in the front top-view image, performing a crosswalk detection in the front top-view image in response to no detection of a stop line, and generating a virtual stop line in response to a detection of a crosswalk, and controlling the vehicle to stop based on the detected stop line or the generated virtual stop line.

According to embodiments, the present disclosure can improve driver convenience.

By the embodiments, the present disclosure can improve the ability to comply with the duty to protect pedestrians and prevent stop-line violations.

Figure 1:
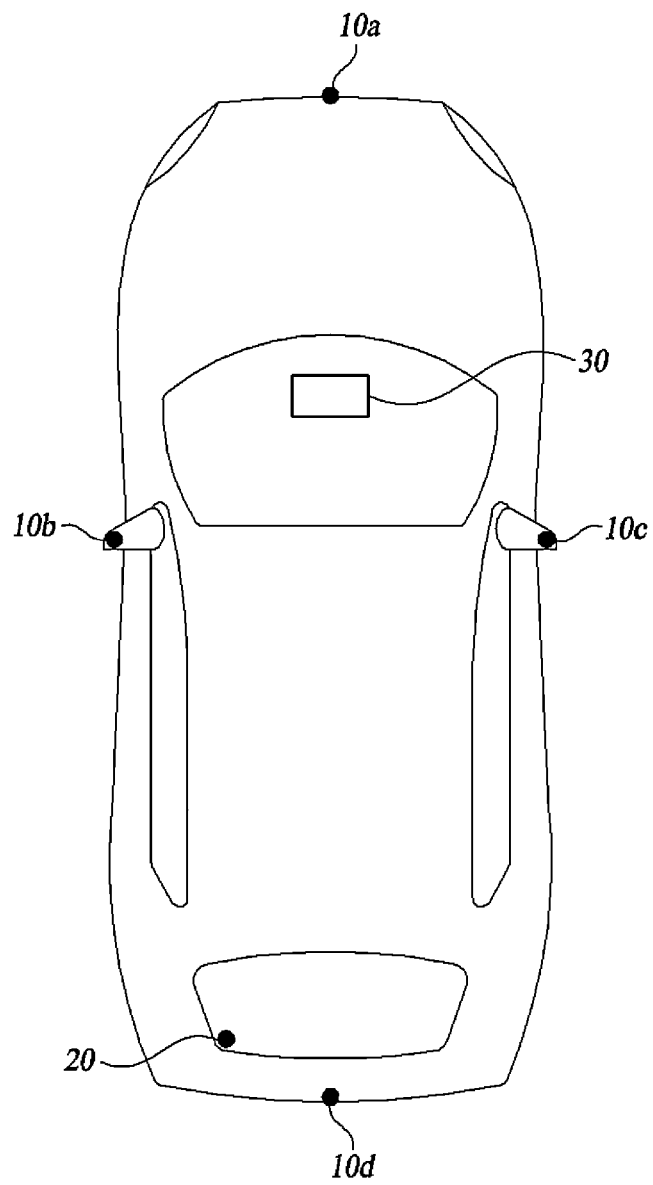
FIG. 1 is an illustration of a vehicle equipped with some of the components for providing a feature for assisting a vehicle to stop in front of a crosswalk or intersection using a SVM, according to at least one embodiment of the present disclosure.

The drawings described herein are for illustration purposes only and are not intended to limit the scope of the present disclosure in any way.

DETAILED DESCRIPTION

Hereinafter, some embodiments of the present disclosure are described in detail with reference to the accompanying drawings. In the following description, like reference numerals designate like elements, although the elements are shown in different drawings. For the purpose of clarity and for brevity, a detailed description of related known components and functions when considered obscuring the subject of the present disclosure has been omitted.

Various ordinal numbers or alpha codes such as first, second, i), ii), a), b), etc., are prefixed solely to differentiate one component from the other but not to imply or suggest the substances, order, or sequence of the components. Throughout this specification, when a part "includes" or "comprises" a component, the part is meant to further include other components, to not exclude thereof unless specifically stated to the contrary. The terms such as "unit," "module," and the like refer to units in which at least one function or operation is processed and they may be implemented by hardware, software, or a combination thereof. The operations of the method or the functions described in connection with the forms disclosed herein may be embodied directly in a hardware or a software module executed by a processor, or in a combination thereof.

The description of the present disclosure to be presented below in conjunction with the accompanying drawings is intended to describe exemplary embodiments of the present disclosure and is not intended to represent the only embodiments in which the technical idea of the present disclosure may be practiced.

The present disclosure relates to a method and an apparatus using SVM front top-view imagery for assisting a vehicle to stop in front of a crosswalk or intersection. The method and apparatus can improve driver comfort and responsiveness to pedestrian protection obligations and prevent stop-line violations.

The capability of assisting in stopping a vehicle in front of a crosswalk or intersection utilizing SVM front top-view imagery according to the present disclosure may be implemented by adding software functionality to an advanced driver assistance system (ADAS) controller in various implementations, although the present disclosure is not so limited.

FIG. 1 is an illustration of a vehicle equipped with some of the components for providing a feature for assisting a vehicle to stop in front of a crosswalk or intersection using an SVM, according to at least one embodiment of the present disclosure. Hereinafter, the feature is referred to as "stop-line observance assist."

Referring to FIG. 1, a vehicle according to at least one embodiment of the present disclosure includes a plurality of SVM cameras 10a, 10b, 10c, 10d, an ADAS controller 20, and a display 30.

The plurality of SVM cameras 10a, 10b, 10c, and 10d capture images of the surrounding area of the vehicle. The captured images are provided to the ADAS controller 20 as input sources for generating surround-view images. The plurality of SVM cameras are illustrated as being mounted on, but not limited to, the front and the rear of the vehicle, and at the bottom of the left and right exterior mirrors of the vehicle. The plurality of SVM cameras may be wide-angle cameras or ultra-wide-angle cameras.

The ADAS controller 20 is responsible for overall control of utilizing the SVM front top-view images to perform functions to assist in stopping the vehicle in front of a crosswalk or intersection.

The ADAS controller 20 is disposed inside the vehicle and may be an electronic control unit (ECU). The ADAS controller 20 may include at least one processor and a memory that may store commands executed by the hardware processor, data, and the like.

The ADAS controller 20 may include sub-controllers, e.g., an SVM controller, a Remote Smart Parking Assistance Controller (RSPA controller), and the like. The SVM controller utilizes images captured by the plurality of SVM cameras to generate a SVM top-view image and/or an image of the surroundings at a point of view selected by the driver. The SVM top-view image is a view from up above with perspective effects removed, i.e., an image showing a bird's-eye or top-down view of the surroundings of a vehicle, without the change in size of objects with distance. In particular, the SVM front top-view image is a cropped and enlarged image of the area in front of the vehicle from the SVM top-view image. The SVM front top-view image is suitable for use in a perception task of road surface markings in front of the vehicle, such as lanes, crosswalks, stop lines, etc.

The display 30 may provide a visual indication to the driver of the progress of the stop-line observance assist performed by the ADAS controller 20. The display 30 may display a surround-view image transmitted from the SVM controller and/or an image of the surroundings at a point of view selected by the driver. The display 30 may be, but is not limited to, a vehicle's digital cluster, AVN display, infotainment display, head-up display (HUD), etc.

Figure 2:
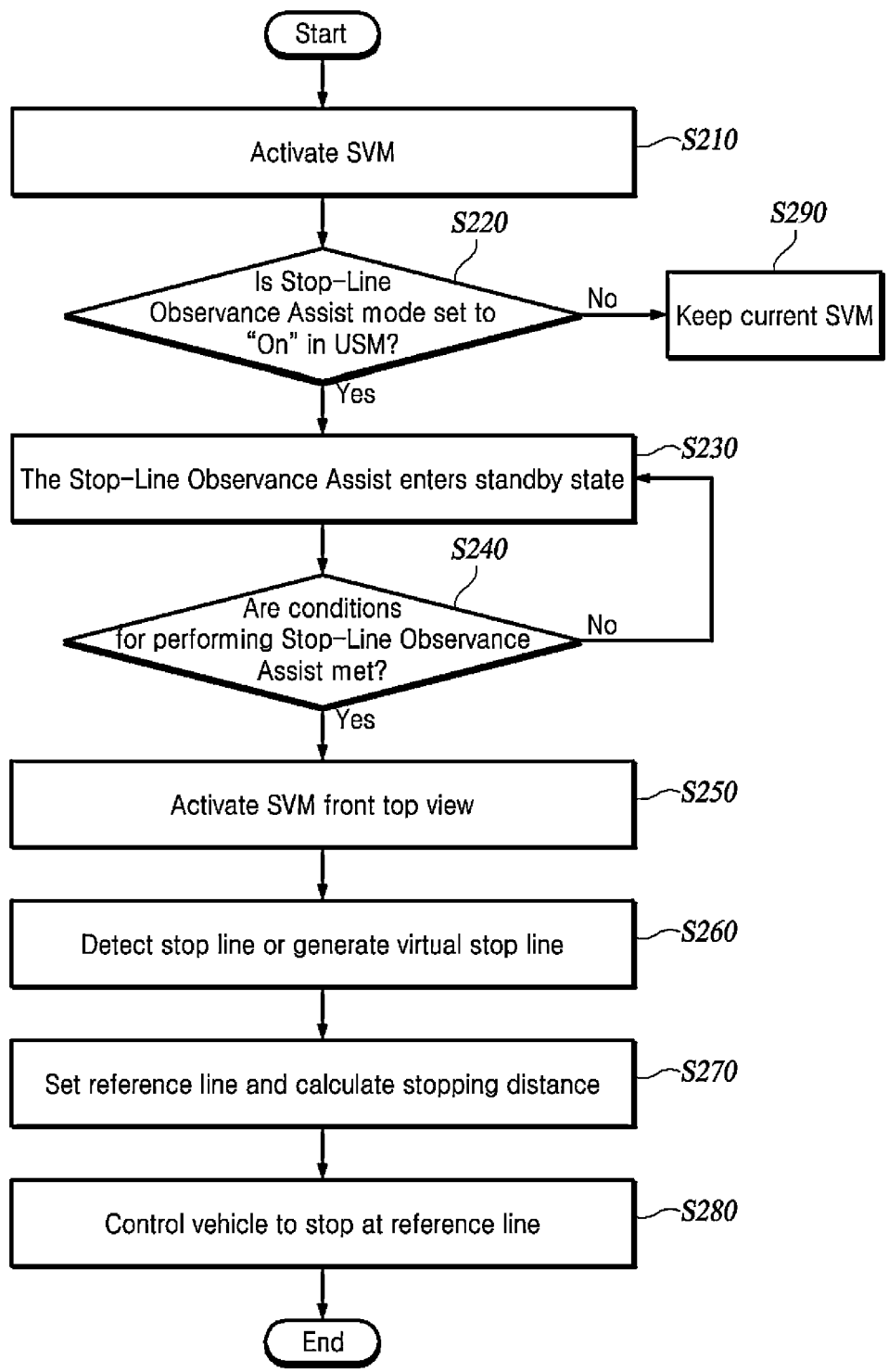
FIG. 2 is an illustration of an example scenario of the operation of a stop-line observance assist according to at least one embodiment of the present disclosure.

FIG. 2 is a flowchart illustrating a scenario of the operation of a stop-line observance assist according to at least one embodiment of the present disclosure.

Referring to FIG. 2, the SVM function is activated (in an operation S210) to utilize the SVM front top-view image. This is because the stop-line observance assist according to at least one embodiment of the present disclosure is performed on the premise that the SVM function is activated.

In an operation S220, the on/off status of the stop-line observance assist is checked. The driver may use User Setting Mode (USM) to set the stop-line observance assist to on or off.

If the stop-line observance assist is off mode, the current SVM function is maintained (in an operation S290). Namely, no stop-line observance assist is performed.

If the stop-line observance assist is in "On" mode, it enters the standby state for its performance (in an operation S230).

The operation determines whether a condition for performing the stop-line observance assist is met (in an operation S240). The condition for performing the stop-line observance assist may be determined by whether the vehicle is stopping. For example, if the speed of the vehicle falls below a threshold value, the vehicle may be determined to be in a stopped state. The speed of the vehicle may be obtained from sensor information of the vehicle, such as a wheel speed signal, a wheel pulse signal, and the like.

If the conditions for performing the stop-line observance assist are not met, the operation proceeds to an operation S230.

If the conditions for performing the stop-line observance assist are met, the operation activates the SVM front top view (in an operation S250). In other words, the SVM front top-view image is obtained using the SVM.

In an operation S260, a stop line is detected or a virtual stop line is generated from the obtained SVM front top-view image. Upon detecting a crosswalk without a stop line in the SVM front top-view image, the operation generates a virtual stop line. At this time, if no stop line is detected and a virtual stop line fails to be generated, the stop-line observance assist may be terminated for safety.

The operation sets, based on the detected stop line or the generated virtual stop line, a reference line at which the vehicle should stop and calculates a stopping distance (in an operation S270).

The operation may perform the reference line setting and stopping distance calculation by further taking into account a mobile object detected in the SVM front top-view image. For example, if there is a mobile object passing through a crosswalk or intersection, the operation may set the reference line and calculate the stopping distance by securing an additional safety distance. In this example, the moving object may be a pedestrian, cyclist, etc. traveling through the crosswalk or intersection.

The reference line setting and stopping distance calculation may be performed by further taking into account whether the stop line or crosswalk detected in the SVM front top-view image is located within a child protection zone. For example, if a stop line or crosswalk is detected within a child protection zone, the operation may set the reference line and calculate the stopping distance by securing an additional safety distance.

The operation controls the vehicle to stop at the reference line (in an operation S280). The stop control may be performed mildly in accordance with Remote Smart Parking Assistance (RSPA). For example, the operation may control the vehicle via, but not limited to, an RSPA controller, a Remote Parking Pilot (RPP) controller, or the like. Visual and/or audible information may be provided to the driver during the stop-control process. For example, visual and/or audible information may be provided about the status of performing a function, such as "activating stop-line observance assist," "moving closer to the stop line," "terminating stop-line observance assist," etc.

Meanwhile, if, while controlling the vehicle, an alarm situation of Parking Distance Warning (PDW) or Parking Collision Assistance (PCA) occurs, or if another situation of the driver's attempt to make a SVM view switch occurs, the operation may pause the performance of the stop-line observance assist and wait for the situation to end before resuming the stop-line observance assist. This is for safety purposes.

Figure 3:
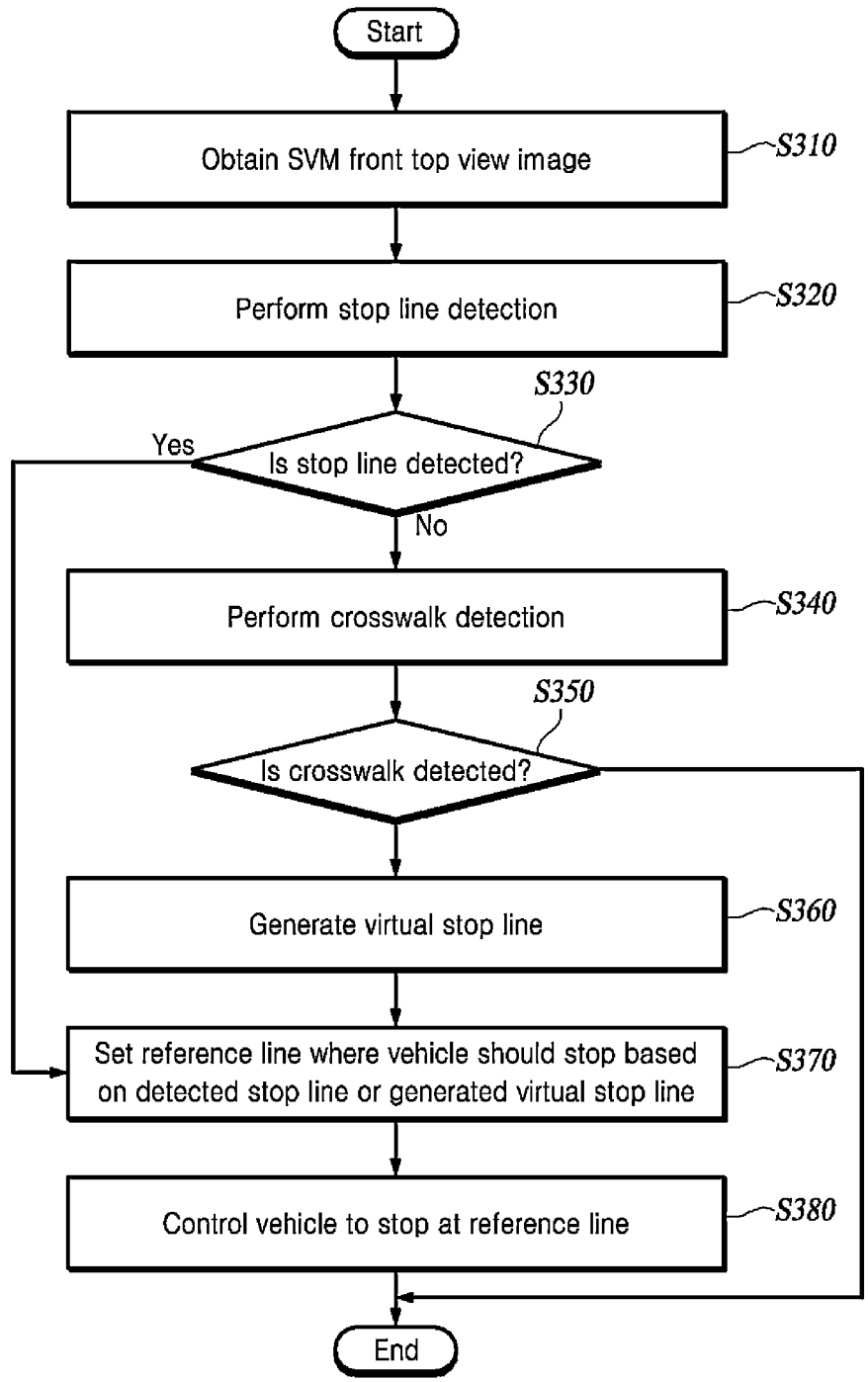
FIG. 3 is a flowchart of a method for assisting a vehicle to stop in front of a crosswalk or intersection utilizing an SVM, according to at least one embodiment of the present disclosure.

FIG. 3 is a flowchart of a method for assisting a vehicle to stop in front of a crosswalk or intersection utilizing an SVM, according to at least one embodiment of the present disclosure.

Referring to FIG. 3, to perform the stop-line observance assist, the method obtains a front top-view image of the vehicle by using a SVM (in an operation S310). The front top-view image is utilized to detect a stop line or generate a virtual stop line. The front top-view image is utilized to set a reference line at which the vehicle should stop and to calculate a stopping distance.

The method performs stop-line detection on the front top-view image (in an operation S320).

Figure 4A:
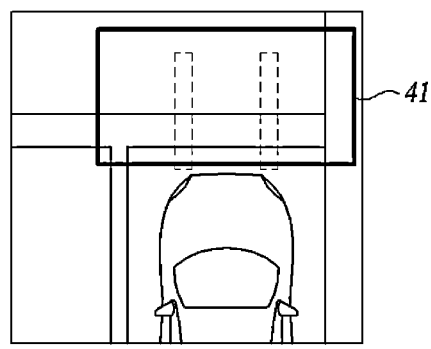
FIGS. 4A, 4B and 4C are diagrams illustrating a region of interest being set, a detected stop line, and a set reference line, when a stop line is horizontal, respectively.
Figure 5A:
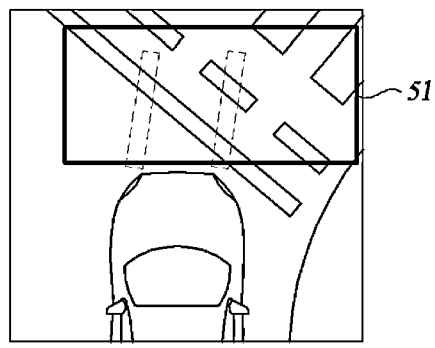
FIGS. 5A, 5B and 5C are diagrams illustrating a region of interest being set, a detected stop line, and a set reference line, when a stop line is diagonal, respectively.
Figure 6A:
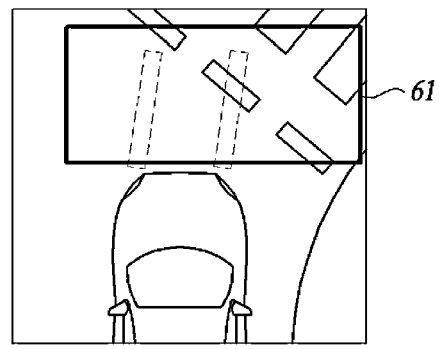
FIGS. 6A, 6B and 6C are diagrams illustrating a region of interest being set, a virtual stop line being generated, and a set reference line, in the case of a crosswalk without a stop line, respectively.

First, the method sets a first region of interest (ROI) in the front top-view image for stop-line detection. This is to reduce the amount of computation for detecting the stop line. The first region of interest may be set to the upper region in front of the front bumper of the vehicle in the front top-view image. When the front top-view image shows along with forward parking guidelines, the first region of interest may be set to a region around the forward parking guidelines in front of the front bumper of the vehicle in the front top-view image. For example, FIG. 4A, FIG. 5A, and FIG. 6A illustrate rectangular areas 41, 51, and 61 in front of the vehicle, which may be set as the first regions of interest.

The method processes the set first region of interest with an edge detection algorithm to detect feature points corresponding to its edges and obtains, from the detected feature points, the first feature points having characteristics of the stop line.

An edge detection algorithm is one of the methods for extracting features of images in computer vision, which detects, as an edge, points in an image where the brightness value of pixels changes abruptly in one direction. Edge detection algorithms may include sobel filter, scharr filter, canny edge detection, and the like. In one embodiment, the canny edge detection is used for accurate edge detection and single edge detection. Canny edge detection algorithm typically involves Gaussian filtering for noise removal, computing the magnitude and direction of a gradient, non-maximum suppression (NMS), and hysteresis edge tracking.

The canny edge detection algorithm is used on the feature points corresponding to the detected edges, to select the first feature points that have the characteristics of the stop line. For example, a stop line has characteristics of being painted as a white solid line with a certain width a certain distance ahead of the point where stopping is required (e.g., a crosswalk, intersection, railroad crossing, stopping spot, etc.), crossing a lane, etc. Using these characteristics of the stop line, the algorithm may select the feature points having the characteristics of the stop line.

When detecting edges corresponding to the stop line, the sigma ($\sigma$) value of the Gaussian filter used in the canny edge detection algorithm may be adjusted according to the illumination value around the vehicle. For example, at night, the sigma value of the Gaussian filter may be larger than that during the day.

If no first feature points of the edge corresponding to the stop line are obtained, the stop line detection is terminated.

With the first feature points of the edge corresponding to the stop line obtained, the method utilizes a corner detection algorithm to perform a corner point detection. In particular, the method sets a second region of interest including the first feature points in the front top-view image, and utilizes the corner detection algorithm on the second region of interest to obtain the second feature points corresponding to the corners. This is to improve the accuracy of the stop line detection by further performing corner detection. A corner detection algorithm is one of the methods for extracting features in images, which detects, as corners, points in an image where the brightness value of pixels changes abruptly in all directions. Corner detection algorithms may include, but are not limited to, Harris Corner Detection, Good Features to Track (GFTT), Features from Accelerated Segment Test (FAST), and the like.

The method performs line fitting on the first feature points detected by edges and the second feature points detected by corners to obtain at least one straight line. Line fitting is to perform a straight line detection and it may include, but is not limited to, Method of Least Squares, RANdom SAmple Consensus (RANSAC), Hough Transform, and the like.

Figure 4B:
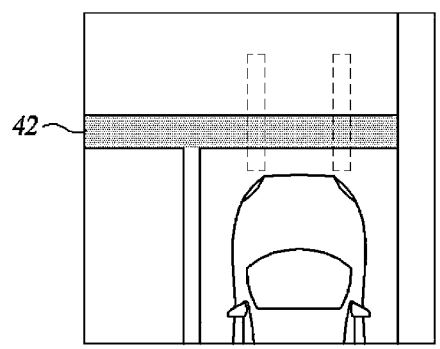
Figure 5B:
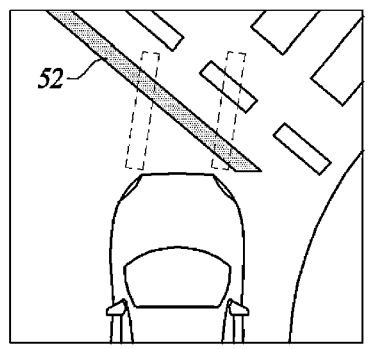

The method detects, from one or more straight lines obtained through the line fitting process, the straight line closest to the vehicle as a stop line. For example, FIG. 4B and FIG. 5B illustrate detected stop lines 42 and 52, respectively.

The method determines whether the stop line is detected (in an operation S330), and when the stop line is detected, proceeds to an operation S370.

If no stop line is detected, the method performs crosswalk detection in the front top-view image (in an operation S340).

In particular, the method sets a first region of interest in the front top-view image. Here, the first region of interest is the same as the one in the step of performing stop-line detection.

The method utilizes the canny edge detection algorithm on the set first region of interest to detect feature points corresponding to edges, and it obtains, from the detected feature points, the first feature points having characteristics of a crosswalk. For example, a crosswalk is installed in the form of zebra stripes with white marks across the roadway, and the width of the crosswalk is at least four meters, taking into account the crossing pedestrian traffic, walking speed, pedestrian signal cycle, etc. Using these characteristics of crosswalks, the method may select feature points that characterize crosswalks.

When detecting edges that correspond to a crosswalk, the method may adjust the sigma (c) value of the Gaussian filter used in the canny edge detection algorithm based on the illumination value around the vehicle. For example, at night, the sigma value of the Gaussian filter may be made to have a larger value than that during the day.

The method determines whether a crosswalk is detected (in an operation S350). Whether a crosswalk is detected may be determined by whether the first feature points of the edges corresponding to the crosswalk are obtained.

If no crosswalk is detected, the stop-line observance assist may be terminated. This is for safety purposes since none of the stop line and the crosswalk has been detected.

Figure 6B:
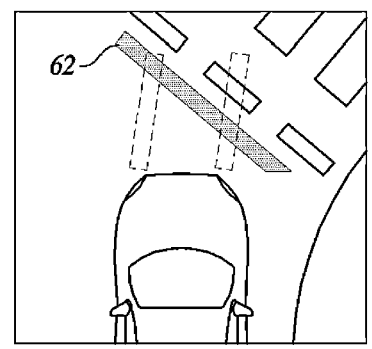

When a crosswalk is detected, the method generates a virtual stop line (in an operation S360). In particular, the method sets a second region of interest including first feature points that characterize a crosswalk in the front top-view image, and it utilizes a corner detection algorithm on the second region of interest to obtain second feature points corresponding to corners. The method performs line fitting on the obtained first feature points and second feature points to obtain one or more straight lines. The method selects a candidate straight line closest to the vehicle from the obtained one or more straight lines. The method generates a virtual stop line spaced a certain distance from the selected candidate straight line in the direction of the vehicle and parallel to the selected candidate straight line. For example, FIG. 6B illustrates a generated virtual stop line 62.

If no virtual stop line is generated, the stop-line observance assist may be terminated. This is for the sake of safety.

Meanwhile, the stop-line observance assist according to at least one embodiment of the present disclosure begins to control the movement of the vehicle from the time the vehicle is completely stopped by the driver. Therefore, the detected stop line or the generated virtual stop line needs to be continuously tracked and corrected until the vehicle is completely stopped by the driver. For this purpose, the method may utilize an Extended Kalman Filter (EKF) or an Unscented Kalman Filter (UKF) to track and correct the detected stop line or the generated virtual stop line.

Figure 4C:
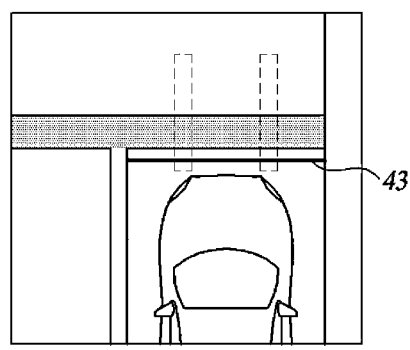
Figure 5C:
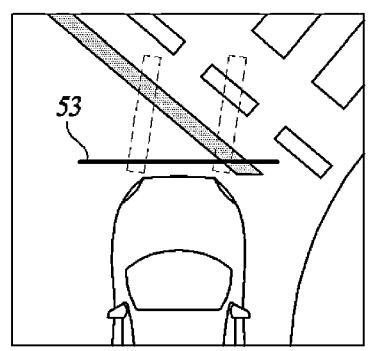
Figure 6C:
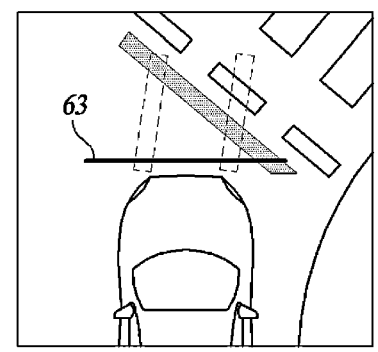

When a stop line is detected or a virtual stop line is generated, the method sets a reference line at which the vehicle should stop (in an operation S370). Specifically, the method calculates a longitudinal minimum distance between the detected stop line or the generated virtual stop line and the vehicle, and sets in front of the vehicle a reference line perpendicular to the longitudinal direction of the vehicle and spaced apart by the calculated minimum distance from the vehicle. This is because the angle that the detected stop line or the generated virtual stop line forms with the longitudinal axis of the vehicle may vary depending on the situation. In other words, the longitudinal distance between the detected stop line or the generated virtual stop line and the front bumper of the vehicle may be different for each point on the detected stop line or the generated virtual stop line. Therefore, a reference line needs to be established that is at least as far away as the stopping distance or separation distance that the vehicle must travel before stopping. For example, FIG. 4C, FIG. 5C, and FIG. 6C illustrates reference lines 43, 53, and 63, respectively.

The method may set the reference line conservatively upon detection of a moving object located in front of the vehicle. Specifically, a safety distance may be calculated by subtracting a certain distance from the distance between the detected moving object and the vehicle, and if the calculated safety distance is shorter than the longitudinal minimum distance between the detected stop line or the generated virtual stop line and the vehicle, the safety distance may be set as the longitudinal minimum distance, and a reference line perpendicular to the longitudinal direction of the vehicle and spaced apart by the set minimum distance may be set in front of the vehicle.

The method controls the vehicle to stop at the set reference line (in an operation S380). The stop-control process is carried out mildly. For example, the vehicle may be controlled via, but not limited to, an RSPA controller, a Remote Parking Pilot (RPP) controller, or the like. Visual and/or audible information may be provided to the driver during the stop-control process.

Meanwhile, in response to an occurrence of an alarm situation of Parking Distance Warning or Parking Collision Assistance, or another situation of the driver's attempt to make an SVM view switch, the method may pause the performance of the stop-line observance assist and wait for the situation to end before resuming the stop-line observance assist. This is for safety purposes.

Each component of the device or method according to an embodiment of the present disclosure may be implemented by hardware, software, or a combination of hardware and software. In addition, the function of each component may be implemented by software and the microprocessor may be implemented to execute the function of software corresponding to each component.

Various implementations of the systems and techniques described herein may be implemented by digital electronic circuits, integrated circuits, field programmable gate arrays (FPGAs), application specific integrated circuits (ASICs), computer hardware, firmware, software, and/or a combination thereof. These various implementations may include being implemented in one or more computer programs executable on a programmable system. The programmable system includes at least one programmable processor (which may be a special purpose processor or a general purpose processor) coupled to receive data and instructions from, and transmit data and instructions to, a storage system, at least one input device, and at least one output device. Computer programs (also known as programs, software, software applications or code) include instructions for a programmable processor and are stored on a "computer-readable recording medium."

The computer-readable storage medium includes all kinds of storage devices that store data readable by a computer system. The computer-readable storage medium may include non-volatile or non-transitory medium such as ROM, CD-ROM, magnetic tape, floppy disk, memory card, hard disk, magneto-optical disk, and storage device, and also further include a transitory medium such as a data transmission medium. Moreover, the computer-readable storage medium may be distributed in computer systems connected through a network, and computer-readable codes may be stored and executed in a distributed manner.

In the flowcharts in the present specification, it is described that each process sequentially occurs, but this is merely an example of the technology of an embodiment of the present disclosure. In other words, a person having ordinary skills in the art to which an embodiment of the present disclosure pertains may make various modifications and variations by changing the orders described in the flowcharts in the present specification or by undergoing one or more of the processes in parallel within the essential characteristics of an embodiment of the present disclosure, so the flowcharts in this specification are not limited to a time-series order.

Although some embodiments of the present disclosure have been described for illustrative purposes, those having ordinary skill in the art should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, one of ordinary skill in the art would understand the scope of the present disclosure is not to be limited by the above explicitly described embodiments but by the claims and equivalents thereof.

REFERENCE NUMERALS

10: SVM camera
20: ADAS controller
30: display

What is claimed is:

1. A method of assisting a vehicle to stop at crosswalks and intersections by using a surround-view monitor (SVM), the method comprising:
   obtaining a front top-view image of the vehicle by the SVM;
   performing a stop line detection in the front top-view image;
   performing a crosswalk detection in the front top-view image in response to no detection of a stop line in the front top-view image, and generating a virtual stop line in response to a detection of a crosswalk in the front top-view image; and
   controlling the vehicle to stop based on the detected stop line or the generated virtual stop line,
   wherein performing the stop line detection comprises:
      setting a first region of interest in the front top-view image, wherein the first region of interest is an upper region relative to a front bumper of the vehicle in the front top-view image;
      detecting feature points corresponding to edges by using an edge detection algorithm for the first region of interest, and obtaining first feature points having characteristics of a stop line among detected feature points;
      setting a second region of interest including the first feature points in the front top-view image upon obtaining the first feature points, and obtaining second feature points corresponding to corners using a corner detection algorithm for the second region of interest;
      obtaining at least one or more straight lines by performing line fitting on the first feature points and the second feature points; and
      detecting, as the stop line, the straight line closest to the vehicle among the at least one or more straight lines.

2. The method of claim 1, wherein performing the stop line detection further comprises:
   correcting the stop line by using an extended Kalman filter or an unscented Kalman filter.

3. The method of claim 1, further comprising:
   adjusting a sigma value of a Gaussian filter used in the edge detection algorithm based on ambient illumination of the vehicle.

4. The method of claim 1, wherein controlling the vehicle to stop comprises:
   calculating a longitudinal minimum distance between the detected stop line or the generated virtual stop line and the vehicle;
   setting a reference line in front of the vehicle perpendicular to a longitudinal direction of the vehicle and spaced apart by the longitudinal minimum distance; and
   controlling the vehicle to stop at the set reference line.

5. The method of claim 1, further comprising:
   detecting a mobile object located in front of the vehicle in the front top-view image, and
   wherein controlling the vehicle to stop comprises:
   calculating a longitudinal minimum distance between the detected stop line or the generated virtual stop line and the vehicle;
   calculating a safe distance by subtracting a certain distance from a distance between the detected mobile object and the vehicle;
   setting a reference line in front of the vehicle perpendicular to a longitudinal direction of the vehicle and spaced apart by the longitudinal minimum distance; and
   controlling the vehicle to stop at the set reference line.

6. The method of claim 5, further comprising: upon determining that the safe distance is less than the longitudinal minimum distance, setting the safe distance to the longitudinal minimum distance.

7. A method of assisting a vehicle to stop at crosswalks and intersections by using a surround-view monitor (SVM), the method comprising:
   obtaining a front top-view image of the vehicle by the SVM;
   performing a stop line detection in the front top-view image;
   performing a crosswalk detection in the front top-view image in response to no detection of a stop line in the front top-view image, and generating a virtual stop line in response to a detection of a crosswalk in the front top-view image; and
   controlling the vehicle to stop based on the detected stop line or the generated virtual stop line,
   wherein generating the virtual stop line comprises:
      setting a first region of interest in the front top-view image, wherein the first region of interest is an upper region relative to a front bumper of the vehicle in the front top-view image;
      detecting feature points corresponding to edges by using a canny edge detection algorithm for the first region of interest, and obtaining first feature points having characteristics of a crosswalk among detected feature points;
      setting a second region of interest including the first feature points in the front top-view image upon obtaining the first feature points, and obtaining second feature points corresponding to corners using a corner detection algorithm for the second region of interest;
      obtaining at least one or more straight lines by performing line fitting on the first feature points and the second feature points;
      selecting a candidate straight line closest to the vehicle from the at least one or more straight lines; and
      generating a virtual stop line spaced a certain distance from the candidate straight line toward the vehicle and parallel to the candidate straight line.

8. The method of claim 7, wherein generating the virtual stop line further comprises:

correcting the virtual stop line by using an extended Kalman filter or an unscented Kalman filter.

9. The method of claim 7, further comprising:
adjusting a sigma value of a Gaussian filter used in the canny edge detection algorithm based on ambient illumination of the vehicle.

10. A computing device comprising at least one processor and a memory operatively coupled to the at least one processor,
wherein the memory stores instructions that cause the at least one processor to perform operations in response to an execution of the instructions by the at least one processor, and
wherein the operations comprise:
obtaining a front top-view image of a vehicle by using a surround-view monitor (SVM);
performing a stop line detection in the front top-view image;
performing a crosswalk detection in the front top-view image in response to no detection of a stop line in the front top-view image, and generating a virtual stop line in response to a detection of a crosswalk in the front top-view image; and
controlling the vehicle to stop based on the detected stop line or the generated virtual stop line,
wherein performing the stop line detection comprises:
setting a first region of interest in the front top-view image, wherein the first region of interest is an upper region relative to a front bumper of the vehicle in the front top-view image;
detecting feature points corresponding to edges by using an edge detection algorithm for the first region of interest, and obtaining first feature points having characteristics of a stop line among detected feature points;
setting a second region of interest including the first feature points in the front top-view image upon obtaining the first feature points, and obtaining second feature points corresponding to corners using a corner detection algorithm for the second region of interest;
obtaining at least one or more straight lines by performing line fitting on the first feature points and the second feature points; and
detecting, as the stop line, the straight line closest to the vehicle among the at least one or more straight lines.

11. The computing device of claim 10, wherein performing the stop line detection further comprises:
correcting the stop line by using an extended Kalman filter or an unscented Kalman filter.

12. The computing device of claim 10, wherein the operations further comprise: adjusting a sigma value of a Gaussian filter used in the edge detection algorithm based on ambient illumination of the vehicle.

13. The computing device of claim 10, wherein generating the virtual stop line comprises:

setting the first region of interest in the front top-view image;
detecting feature points corresponding to edges by using a edge detection algorithm for the first region of interest, and obtaining first feature points having characteristics of a crosswalk among detected feature points;
setting a second region of interest including the first feature points in the front top-view image upon obtaining the first feature points, and obtaining second feature points corresponding to corners using the corner detection algorithm for the second region of interest;
obtaining at least one or more straight lines by performing line fitting on the first feature points and the second feature points;
selecting a candidate straight line closest to the vehicle from the at least one or more straight lines; and
generating a virtual stop line spaced a certain distance from the candidate straight line toward the vehicle and parallel to the candidate straight line.

14. The computing device of claim 13, wherein the generating of the virtual stop line further comprises:
correcting the virtual stop line by using an extended Kalman filter or an unscented Kalman filter.

15. The computing device of claim 13, wherein the operations further comprise: adjusting a sigma value of a Gaussian filter used in the edge detection algorithm based on ambient illumination of the vehicle.

16. The computing device of claim 10, wherein controlling the vehicle to stop comprises:
calculating a longitudinal minimum distance between the detected stop line or the generated virtual stop line and the vehicle;
setting a reference line in front of the vehicle perpendicular to a longitudinal direction of the vehicle and spaced apart by the longitudinal minimum distance; and
controlling the vehicle to stop at the set reference line.

17. The computing device of claim 10, wherein the operations further comprise:
detecting a mobile object located in front of the vehicle in the front top-view image, and wherein controlling the vehicle to stop comprises:
calculating a longitudinal minimum distance between the detected stop line or the generated virtual stop line and the vehicle;
calculating a safe distance by subtracting a certain distance from a distance between the detected mobile object and the vehicle;
setting a reference line in front of the vehicle perpendicular to a longitudinal direction of the vehicle and spaced apart by the longitudinal minimum distance; and
controlling the vehicle to stop at the set reference line.

18. The computing device of claim 17, wherein when the safe distance is less than the longitudinal minimum distance, the safe distance is set to the longitudinal minimum distance.

* * * * *